United States Patent [19]

Fosnacht

[11] Patent Number: 4,585,475
[45] Date of Patent: Apr. 29, 1986

[54] METHOD FOR RECYCLING OILY MILL SCALE

[75] Inventor: Donald R. Fosnacht, Merrillville, Ind.

[73] Assignee: Inland Steel Company, Chicago, Ill.

[21] Appl. No.: 314,107

[22] Filed: Oct. 23, 1981

Related U.S. Application Data

[63] Continuation of Ser. No. 162,818, Jun. 25, 1980, abandoned.

[51] Int. Cl.$^4$ .............................................. C21C 7/068
[52] U.S. Cl. ........................................... 75/51.2; 75/56
[58] Field of Search .......................................... 75/3-5, 75/26, 40, 42, 44 R, 44 S, 51, 56, 60; 264/111, 117

[56] References Cited

U.S. PATENT DOCUMENTS

| | | | |
|---|---|---|---|
| 1,994,378 | 3/1935 | Williams et al. | 75/3 |
| 3,189,436 | 6/1965 | Burstlein | 75/5 |
| 3,340,044 | 9/1967 | MacAfee et al. | 75/40 |
| 3,762,886 | 10/1973 | Triska | 75/44 R |
| 4,029,497 | 6/1977 | Nixon | 75/60 |
| 4,148,627 | 4/1979 | Haley | 75/3 |

FOREIGN PATENT DOCUMENTS 54-4216 1/1979 Japan ......................................... 75/3
54-4215 1/1979 Japan ......................................... 75/3

OTHER PUBLICATIONS

Perry, R. H. et al; *Chemical Engineers' Handbook*, McGraw Hill Book Company, p. 9—9, TP155 P4 (1973).

*Primary Examiner*—Melvyn J. Andrews
*Attorney, Agent, or Firm*—Marshall, O'Toole, Gerstein, Murray & Bicknell

[57] ABSTRACT

Oily mill scale recovered from steel manufacturing operations downstream of a refining stage for molten steel is recycled to the refining stage. Coarse particles of mill scale are removed in a pre-screening operation, the mill scale is mixed and blended with a binder, and the mixture is agglomerated into shapes, such as briquettes, using external mechanical pressure. The agglomerated shapes are introduced into molten metal containing excessive carbon, where the shapes act as a coolant and the iron oxide in the mill scale reacts with some of the carbon. The oily mill scale is neither deoiled nor ground more finely prior to introduction into the molten metal, and all processing of the mill scale is conducted under ambient conditions of temperature, pressure and atmosphere. The agglomerated shapes may be aged prior to introduction into the molten metal.

12 Claims, No Drawings

METHOD FOR RECYCLING OILY MILL SCALE

This is a continuation of application Ser. No. 162,818, filed June 25, 1980, and now abandoned.

BACKGROUND OF THE INVENTION

The present invention relates to the refining of molten steel, and more particularly to the refining and cooling of molten steel with oily mill scale particles recovered from steel manufacturing operations conducted downstream of the refining step.

Steel is produced by refining hot metal from a blast furnace. The blast furnace hot metal contains a high carbon content and other ingredients, such as aluminum or silicon, at undesirably high levels, which must be removed by oxidation. In a typical steel refining operation, involving a basic oxygen furnace (B.O.F.), oxygen is injected into a hot molten iron contained in a vessel. The resulting reaction, between the oxygen and the carbon or other oxidizable impurities, is exothermic and generates tremendous quantities of heat, requiring the introduction of a cooling agent into the vessel in which the refining operation is conducted.

In the past, it has been conventional to cool molten steel during the refining operation by adding scrap steel or by adding iron ore pellets, both of which have drawbacks and disadvantages. Scrap steel must often be purchased on the open market, which is expensive, and scrap steel has a relatively low cooling capacity compared to an iron-oxide containing material. When iron ore pellets are to be used in steel refining, the iron ore therein must first be subjected to processing operations which are also relatively expensive. More specifically, raw iron ore contains impurities such as alumina and silica which must be removed from the iron ore before it can be used in a steel refining operation, and the removal of these impurities requires expensive processing operations, such as fine grinding.

After molten steel has been refined, it is solidified and then subjected to a succession of rolling operations during which the steel may be successively heated and cooled. During the successive heating and cooling of the steel, or during storage between various rolling operations, the surface of the steel oxidizes to form mill scale which is essentially an oxide of iron that contains about 70–75 wt.% iron. This mill scale flakes off during the handling and rolling of the steel and is recovered at the steel mill for recycling to earlier stages of the steel making process.

Mill scale is a prime material for use in steel making or blast furnace operations because mill scale is a relatively coarse, dense, waste oxide material of relatively high iron content which is low in tramp impurities such as alumina or silica.

Typically, mill scale recovered for recycling is initially subjected to a pre-screening operation to separate out the coarser particles larger than 3/16 in. (4.76 mm.) which may be charged directly into a blast furnace. The remaining, finer particles of mill scale must be subjected to a sintering operation before they can be added to a blast furnace. However, mill scale is oily, and, before it can be subjected to sintering, the oil must be removed, which is expensive.

Mill scale may be added to molten steel while the latter undergoes refining in a steel making vessel, but it is desirable that the mill scale be added in the form of an agglomerated shape. This agglomerated shape should have sufficient strength to withstand the forces to which it is subjected during handling and transportation. These forces, however, are not so severe as those to which iron oxide-containing materials are subjected when added to a blast furnace. Therefore, the relatively expensive agglomerating procedures to which iron oxide-containing materials (such as iron ore pellets) are subjected prior to introduction into a blast furnace (e.g., special curing or heat hardening operations) are not required in the case of iron oxide-containing materials added to a steel-making vessel.

Pelletizing is one agglomerating procedure which may be used without heating to produce an agglomerated shape. However, when mill scale in its as-received condition is subjected to a pelletizing operation, the pellets do not have sufficient green strength or aged strength after a reasonable length of time to hold together during normal handling and transportation operations. Green strength is that strength which is present before curing or aging under ambient or other conditions. Pellets normally increase in strength after aging for many hours (e.g., at least 24 hours).

If the mill scale is subjected to a grinding operation before pelletizing, the pellets have increased strength, but, because mill scale contains metallic particles as well as oxide particles, a grinding operation causes an undue amount of wear on the grinding equipment so that, from an expense standpoint, grinding of mill scale in order to render it acceptable for pelletizing, is not a practicable expedient.

An advantage of using mill scale for cooling purposes during a steel refining operation, compared to the cooling effects produced by scrap steel, is that the iron oxide in the mill scale reacts with the carbon and the other oxidizable materials in the molten hot metal, and this is an endothermic or heat-absorbing reaction. Thus, the mill scale cools the molten metal not only because of the temperature differential between the cool mill scale, at the time of its addition, and the hot molten metal, but also because of the heat absorbing, endothermic reaction between the iron oxide in the mill scale and the oxidizable ingredients in the molten metal.

SUMMARY OF THE INVENTION

In accordance with the present invention, oily mill scale is added to molten steel containing excess carbon, during the refining of the molten steel, to provide a coolant for the molten steel. In addition, the iron content of the mill scale is recovered and absorbed into the steel.

Initially, oily mill scale recovered from steel manufacturing operations downstream of the steel refining process is subjected to an initial separation step during which the coarsest mill scale particles, i.e., those larger than 3/16" (4.76 mm.), are separated from the smaller mill scale particles. Next, the particles are mixed with a binder, which may be any one of several binders heretofore utilized in producing agglomerated shapes from mill scale or iron ore, to the extent that these binders are appropriate for use in the present invention, and this will be discussed below.

The mixture of particles and binder are then agglomerated into agglomerated shapes, using external mechanical pressure. As noted above, the preparation of an agglomerated shape composed of mill scale is not practicable utilizing a pelletizing procedure unless the mill scale has been subjected to an expensive grinding operation before pelletizing. In a method in accordance with the present invention, grinding operations are eliminated. Accordingly, the phrase "using external mechanical pressure" in connection with an agglomerating operation in the method of the present invention, excludes pelletizing but includes briquetting.

The oily mill scale undergoes no deoiling at any stage in a method in accordance with the present invention.

In preferred embodiments of the present invention, the shapes produced by the agglomerating step have sufficient green strength to withstand the forces to which they are subjected during normal handling and transportation operations. However, in many cases, it is preferable to let the agglomerated shapes age, under ambient conditions of temperature, pressure and atmosphere, to increase the strength of the agglomerated shapes. Typically, at least a 24-hour aging period is employed, although less time may suffice for some binders.

In all embodiments, agglomerated shapes, having sufficient strength to withstand the forces they encounter during normal handling and transportation, are added to molten steel during refining thereof to provide a coolant for the molten steel. All processing steps performed prior to the addition of the agglomerated shapes to the molten steel are conducted under ambient conditions of temperature, pressure and atmosphere.

In addition to cooling the steel, the agglomerated shapes of mill scale provide an oxidant for at least some of the excess carbon in the molten steel.

In one embodiment of the invention, prior to agglomeration the oily mill scale particles are mixed with iron oxide flue dust fines. The mixture may contain up to 50% flue dust fines, but typically it is less than that, in the range 25-35 wt.% flue dust fines. The addition to the agglomerated shapes of iron oxide flue dust fines increases the strength of the agglomerated shapes.

Another addition material for increasing the strength of the agglomerated shapes is a material known as swarf, which is obtained by the grinding of billets during the steel manufacturing operations. Swarf contains about 90% iron, including about 65% metallic iron. The rest of the iron is present as iron oxide. The agglomerated shape may contain, as part of the mixture of mill scale and swarf, up to 50 wt.% swarf, although 1-5 wt.% swarf is the preferred range.

In addition to oily mill scale, binders and strengthening agents comprising iron oxide flue dust fines and swarf, the agglomerated shape may also contain up to 10 wt.% water, as part of the binder, in some embodiments.

Other features and advantages are inherent in the method claimed and disclosed or will become apparent to those skilled in the art from the following detailed description.

DETAILED DESCRIPTION

The starting material for a method in accordance with the present invention is oily mill scale which is recovered from the steel manufacturing operations performed downstream of the steel refining process. When oily mill scale particles are added to a heated processing operation, such as sintering, the oil in the mill scale causes pollution-control problems, and the mill scale must be deoiled before it is subjected to a sintering operation. However, at the temperatures prevailing in the B.O.F. during a steel refining operation, any oil which is present in the oily mill scale is flashed off and does not present a pollution-control problem. Therefore, there is no deoiling step in the method of the present invention.

The oily mill scale particles are initially subjected to a pre-screening or separating step to separate out those particles which are larger than 3/16" (4.76mm.). The coarse mill scale particles (i.e., those larger than 3/16") may be charged directly into a blast furnace or an open hearth furnace without undergoing an agglomerating operation. After the separating step, the remaining oily mill scale particles typically have a size of 100% minus 3/16" (4.76 mm.), 90% plus 100 mesh and 99% plus 325 mesh.

Oily mill scale particles in the size range described in the preceding sentence are then mixed and blended with a binder which is typically added in a range of 3-10 wt.% of the resulting mixture. The mill scale is mixed with the binder without subjecting the mill scale to any kind of a grinding operation. The mixing is performed with conventional equipment.

The mixture of particles and binder are then agglomerated into shapes, using external mechanical pressure. A typical agglomerating operation comprises briquetting utilizing conventional briquetting rolls to produce briquettes typically having a size 3" square by 1½" deep or 1½" square by 1" deep. The agglomerating step is conducted under ambient conditions of temperature, pressure and atmosphere.

The mill scale does not have to be subjected to a grinding operation, or any other kind of an operation which reduces the particle size of the mill scale, prior to agglomeration. The agglomerated shapes which result after an agglomerating operation utilizing external mechanical pressure in accordance with the present invention have sufficient strength (either green or aged) to withstand the normal forces to which the shape is subjected during handling and transportation, and this is obtained without reducing the particle size of the mill scale after prescreening. Moreover, because the mill scale does not contain tramp impurities, such as alumina or silica, grinding the mill scale to the fine size necessary to remove such tramp impurities is also unnecessary.

The binder with which the mill scale is mixed may be a conventional binder previously used for binding mill scale or iron ore or other iron oxide-containing material. Suitable binders include a mixture of molasses and lime, a mixture of sodium silicate and Portland cement, or Portland cement alone if mixed with water as described below. Another composition which may be used as a binder is a mixture of a lignosulfonate powder and water or a liquid lignosulfonate. The amount of binder depends upon which binder is used. Some binders require larger amounts thereof in order to impart the desired strength to the resulting agglomerated shape. For example, lignosulfonate powder may be used in amounts as low as 2 wt.% of the mixture of mill scale and binder while Portland cement may require amounts up to 20 wt.% to produce satisfactory strength in the agglomerated shape.

Typically, when Portland cement is used as a binder, it is used in an amount in the range 8-20 wt.%. Portland cement, which is a combination of CaO, $SiO_2$, $Al_2O_3$ and $Fe_2O_3$, contains no water and should have water added thereto when used as a binder for mill scale. The water should be added in an amount up to 10 wt.%.

Water may also be added to other binders used in accordance with the present invention, depending upon the extent to which water was present or absent in these other binders. Thus, with respect to lignosulfonate powder, there is no water present in this binder, and, in one example, about 2.5 wt.% water is combined with about 5 wt.% lignosulfonate powder to produce the desired binder, On the other hand, little, if any, water need be added to any binder containing sodium silicate (e.g., a sodium silicate/Portland cement binder) because commercially available sodium silicate already comes with sufficient water present therein, e.g., about 50% water.

With other binders, water should be added as needed up to 10 wt.%, depending upon the moisture content of the starting materials for the agglomerated shape (including moisture which is already present in the mill scale).

When the binder is a mixture of molasses and lime (e.g., 2 wt.% molasses and 5 wt.% lime), the lime must be hydrated lime ($CaO \cdot H_2O$) in all cases because, if the lime is not fully hydrated, when the resulting agglomerated shape is aged, water will be absorbed from the atmosphere during the aging period causing a swelling and general weakening of the agglomerated shape.

The binder and oily mill scale are mixed and blended at ambient conditions of temperature, pressure and atmosphere. Although heating is not generally required, in those cases where molasses is used as part of the binder, it may be necessary, on a cold day, to heat the tank in which the molasses is contained in order to render the molasses sufficiently runny to transport it for mixing with the mill scale. Other than that, no heating is required for the mixing or blending of the binder with the mill scale, or in any other operation or step in a method in accordance with the present invention.

Following the agglomerating step, the agglomerated shapes are subjected to aging under ambient conditions of temperature, pressure and atmosphere, to increase the strength of the agglomerated shapes. Typically, the agglomerated shapes are aged for 24 hours, although longer aging can be beneficial in many instances. Virtually all agglomerated shapes, no matter what binder is used, will have more strength after aging than when they are green.

One test for determining the strength of an agglomerated shape is to drop it from a height of one meter (3.3 feet) and see how many drops it takes before the agglomerated shape is destroyed.

When the binder consists of Portland cement and water, it has no green strength for all amounts of Portland cement in the range 5-20 wt.% and water in the range 2.5-10 wt.%, expressed as a percentage of the mixture containing the binder and the mill scale. After 24 hours of aging, a drop strength of 1 DFM (drop from one meter) occurs with 5 wt.% Portland cement and 7.5 wt.% water and of 4 DFM with 10 wt.% Portland cement and 2.5 wt.% water. Drop strength increases with an increase in water content up to 10 wt.% and with an increase of Portland cement up to 10 wt.% (6 DFM). Above 10 wt.% Portland cement, drop strength remains essentially the same, even with increased water content, but compressive strength increases (from 6,000-9,000 kPa to 14,000-17,000 kPa). Drop strength and compressive strength continue to increase as aging continues beyond 24 hours up to 10 DFM and 24,000-30,000 kPa after 5 days of aging.

Another binder is composed of molasses (2-5 wt.%) and hydrated lime (2-7 wt.%) ($CaO/H_2O = \frac{1}{2}$). The molasses is typically a blackstrap molasses comprising about 36 wt.% sucrose, 20 wt.% reducing sugars and 24 wt.% water. The lime must be sufficiently hydrated to prevent water absorption during aging which in turn causes swelling a deterioration of the physical properties of the agglomerated shape. This problem may occur even with a 1:1 CaO to $H_2O$ ratio. When the binder is composed of molasses and hydrated lime ($CaO/H_2O = \frac{1}{2}$), there is a green drop strength of at least 1 DFM when the molasses/lime ratio exceeds $\frac{1}{2}$ up to 6 DFM for a 3 wt.% molasses/3 wt.% hydrated lime binder. The drop strength increases up to about 10 DFM for all binders with at least 3 wt.% molasses after 24 hours of aging. Binders with less than 3 wt.% molasses provide increased drop strength (from 0-1 to 2-5 DFM) in all ratios of molasses to hydrated lime after 24 hours of aging except for a 2/7 molasses to hydrated lime ratio which shows no drop strength even after 5 days of aging. The other binders having less than 3 wt.% molasses provide a further increase in drop strength, from 2-5 DFM to 7-9 DFM, when aging is increased from 24 hours to 5 days. Those binders with more than 3 wt.% molasses provide essentially the same drop strength (10 DFM) after 5 days as after 24 hours of aging. The compressive strength increases with increased aging for all ratios of molasses to hydrated lime except the 2/7 ratio. Otherwise, compressive strength ranges from 5,000-19,000 kPa after 24 hours aging to 9,000-29,000 kPa after 5 days aging. Generally, compressive strength increases with increased molasses content, both absolutely and ratio-wise. From the foregoing, it is apparent that a binder composed of molasses and hydrated lime, in proper percentages of each, can provide adequate strength characteristics even when the agglomerated shape is in a green condition.

A molasses-containing binder composed of Portland cement/water in lieu of all or some of the lime water has satisfactory properties after 24 hours of aging but the green strength is low.

In a binder comprising lignosulfonate, the latter may be in the form of a powder or a liquid containing typically about 58 wt.% lignosulfonate solids and the balance water. The lignosulfonates are unmodified or moderately modified organic compounds derived from the sulfite pulping of wood and contain slightly lower amounts of reducing sugars than does molasses (e.g., 15.7 wt.% vs. 20 wt.%). A binder composed of powdered lignosulfonate (3-5 wt.%) and water (1.3-2.4 wt.%) provided a green drop strength of 3-10 DFM. A binder composed of 3-4 wt.% liquid lignosulfonate provided a green drop strength of 1-2 DFM. The addition of lime and water to the lignosulfonate did not affect drop strength either in the green condition or after aging. Both the powdered and liquid lignosulfonate binders provided a maximum drop strength (9-10 DFM) after 24 hours of aging to 5 days did not increase the drop strength. Compressive strength provided by the powdered lignosulfonate binder was 10,000-18,000 kPa after 24 hours, and that provided by the liquid lignosulfonate binder was 14,000-20,000 kPa after 24 hours. Increased aging to 5 days did not increase compressive strength significantly except for the binder containing 5 wt.% powdered lignosulfonate and 2.4 wt.% water which increased from 10,000 kPa after 24 hours to 32,000 kPa after 5 days aging.

After aging, or if the agglomerated shape possesses sufficient green strength to withstand the forces normally encountered during handling and transportation, the agglomerated shape is introduced into the vessel containing the molten steel undergoing refining, as a coolant and to oxidize some of the excess carbon in the molten steel.

The required green strength depends upon the number of transport or handling instances to which the shapes are subjected. In most cases, 2-3 such instances would be involved and a green strength of 2-3 DFM would be required. In other cases, up to 5-6 such instances may be involved requiring a green strength of 5-6 DFM.

The density of an agglomerated shape produced in accordance with the present invention is about 4,300 kg/m$^3$ (268 lb. per ft$^3$). This is greater than the density of iron ore pellets or slag and facilitates penetration by the agglomerated shape of a layer of slag which may overlie the molten steel in the refining vessel.

In some embodiments, the agglomerated shapes are strengthened by introducing into the mill scale, prior to the introduction of a binder, or simultaneously therewith, iron oxide flue dust fines or swarf particles.

Iron oxide flue dust fines are collected from various processing operations normally occurring in the steel mill. Such fines generally have a particle size which is 90% minus 64 microns, and some of these particles may have a size less than one micron.

The agglomerated shapes contain air spaces, and, when the particles of iron oxide flue dust fines are mixed with the oily mill scale particles, the fines particles occupy these spaces.

The addition of fines to the agglomerated shape increases both the green strength and the aged strength of the agglomerated shape, for all binders. This increase in strength occurs at least in part because the fines fill the spaces in the agglomerated shape. In doing so, the fines increase the strength of the agglomerated shape up to a fines content of about 30-35 wt. % of the mixture of fines and oily mill scale particles.

The spaces undergo compression as a result of the mechanical pressure applied during the agglomerating step and then undergo expansion when this pressure is released. The smaller the volume left for the air to occupy, the greater the compression it undergoes and the greater the ensuing expansion. If the expansion is too great it can weaken the agglomerated shape and cause the shape to crumble.

Therefore, in accordance with the present invention, the amount of iron oxide flue dust fines mixed with the oily mill scale particles is controlled so as to fill only some of the volume of the spaces in the shape while leaving unfilled a sufficient volume to limit the compression of air during the agglomerating step so that the ensuing expansion of air is insufficient to crumble the agglomerated shape.

Weakening of the agglomerated shape by expansion of air following the agglomerating step is not a problem when the fines content is no more than about 30-35% of the mixture of fines and oily mill scale, but it becomes more and more of a problem as the fines content increases from about 35% up to about 50%. Therefore, the optimum fines content, from a strength standpoint, is in the range 25-35%. More fines than that can be incorporated into the agglomerated shape, but some strength will be sacrificed in the process. With a fines content above 50%, the strength of the agglomerated shape is weaker than without any fines at all.

Using a mixture of 90 parts of oily mill scale and 10 parts of fines with a binder composed of 3 parts molasses and 4 parts CaO/H$_2$O in a 1:2 ratio provided a green strength of 2-9 DFM. The green strength varied with the source of the fines (e.g., BOF, open hearth or electric furnace iron oxide dust). When the fines content was increased to 20-25 parts the green strength was 9-10 DFM for all sources of fines, and aging did not further increase the drop strength. With the mill scale and binder content essentially unchanged, compressive strength increased with aging from 6,000-11,000 kPa to 21,000-29,000 kPa for a mixture containing 10 parts of fines and from 10,000-26,000 kPa to 27,000-42,000 kPa for a mixture containing 20-25 parts of fines. For a mixture containing oily mill scale and fines, similar results were obtained using binders containing lignosulfonate.

Inclusion of flue dust fines with the oily mill scale reduces the amount of binder required to provide a given level of strength.

When swarf particles are added to the mixture to strengthen the resulting agglomerated shape, the swarf particles should comprise no greater than about 50 wt.% of the mixture of swarf particles and oily mill scale. Preferably the swarf particles comprise 1.5 wt.% of the mixture. The swarf particles have a size in the range 99% minus 6.35 mm. (0.254 in.) to 98% plus 0.149 mm. (0.006 in.). The swarf particles are 90% iron and contain approximately 65% metallic iron along with some iron oxide. Swarf particles typically function in the agglomerated shape in a manner similar to that in which reenforcing rods function in reenforced concrete.

When the agglomerated shape is added to the molten steel, it is added at the beginning of the so-called oxygen blow, during the refining of the steel. At this stage there is excess carbon in the molten metal. The agglomerated shapes act not ony as a coolant in the molten steel undergoing refining, but also react with at least some of the excess carbon in the molten steel, thereby reducing the amount of oxygen gas which must be injected into the molten steel for refining purposes. When steel is refined with an oxygen blow in a B.O.F. (Basic Oxygen Furnace), oxygen is the sole refining gas. The agglomerated shapes are introduced into the molten metal with the shapes at ambient temperature and thus act as a coolant in this respect. In addition, the iron oxide in the mill scale reacts with the excess carbon in the molten metal, in an endothermic, heat-absorbing reaction, and this also functions to cool the molten steel.

The method of the present invention may be used with steel refining processes other than that employing a B.O.F., as the method is useful in any steel refining process in which mill scale can be used as a coolant and as a refining aid to help remove the excess carbon in the molten metal.

In rendering the mill scale useful in steel refining, the present method eliminates the need for deoiling, sinter plant treatment and blast furnace processing of the mill scale and the attendant relatively large expense thereof. Also eliminated is the need to use relatively expensive scrap steel or iron ore pellets as cooling agents in the steel refining process.

The foregoing detailed description has been given for clearness of understanding only, and no unnecessary limitations should be understood therefrom, as modifications will be obvious to those skilled in the art.

I claim:

1. A method for recycling oily mill scale particles recovered from steel manufacturing operations, said method comprising the steps of:

providing oily mill scale particles recovered from steel manufacturing operations;

separating from said oily mill scale those particles larger than 3/16 in. (4.76 mm.);

mixing the particles remaining after said separating step with a binder selected from the group consisting of (1) a binder comprising molasses and hydrated lime and (2) a binder comprising lignosulfonate;

agglomerating said mixture of particles and binder into agglomerated shapes having a composition consisting essentially of said particles and said binder;

said mixing and agglomerating steps comprising providing said agglomerated shapes with a green strength sufficient to permit the use of said agglomerated shapes in a steel refining operation without aging;

providing a bath of molten steel containing excess carbon;

refining said bath of molten steel, using an oxygen blow;

utilizing said agglomerated shapes to provide a coolant for, and to oxidize said excess carbon in, the molten steel by adding said agglomerated shapes to said bath of molten steel, in conjunction with said refining step using said oxygen blow, while the bath contains excess carbon;

all of the agglomerated shapes so utilized being added to the bath of molten steel;

said adding step being performed after said agglomerating step;

said agglomerated shapes having a density which facilitates penetration by said shapes of any layer of slag which may overlie said molten steel;

there being no deoiling or grinding steps performed on said oily mill scale particles prior to said adding step;

said bath of molten steel having a temperature during said refining step which will flash off the oil in said oily mill scale, thereby preventing said oil from acting as a carbonaceous reductant in said bath of molten steel;

all of said steps, recited prior to the recitation of said step of providing a bath of molten steel, being conducted under ambient condtions of temperature, pressure and atmosphere.

2. A method as recited in claim 1 wherein:

said oily mill scale particles have a particle size, after said separating step, of 100%−3/16 in. (4.76 mm.), 90%+100 mesh and 99%+325 mesh.

3. A method as recited in claim 1 wherein said agglomerated shapes contain spaces therein and said method comprises:

mixing, with said oily mill scale particles, iron oxide flue dust fines having a particle size small enough to fill in said spaces in the agglomerated shapes and increase the strength thereof.

4. A method as recited in claim 3 wherein:

said agglomerating step employs external mechanical pressure;

the spaces in said agglomerated shapes contain air which undergoes compression as a result of the mechanical pressure applied during said agglomerating step;

and the amount of said iron oxide flue dust fines mixed with the oily mill scale particles is sufficient to fill only some of said spaces while leaving unfilled sufficient spaces to limit said compression of air during said agglomerating step so that said expansion of the air following the agglomerating step is insufficient to crumble the agglomerated shape.

5. A method as recited in claim 4 wherein:

the mixture of oily mill scale particles and iron oxide flue dust fines comprises no greater than 50 wt.% flue dust fines.

6. A method as recited in claim 5 wherein:

said mixture of oily mill scale particles and iron oxide flue dust fines comprises 25–35 wt.% flue dust fines.

7. A method as recited in claim 4 wherein:

said iron oxide flue dust fines have a particle size of 90% minus 64 microns.

8. A method as recited in claim 1 and comprising:

mixing sufficient water with said oily mill scale particles, prior to said agglomerating step, to provide a total moisture content of no more than 10 wt.% in said agglomerated shapes.

9. A method as recited in claim 1 wherein:

said agglomerating step comprises briquetting.

10. A method as recited in claim 1 and comprising:

mixing swarf particles with oily mill scale to provide a mixture of oily mill scale and swarf particles containing no greater than about 50 wt.% swarf particles, whereby said swarf particles reinforce said agglomerated shape.

11. A method as recited in claim 1 and comprising:

mixing with said oily mill scale, prior to said agglomerating step, an addition selected from the group consisting essentially of iron oxide flue dust fines and swarf particles.

12. A method as recited in claim 1 wherein:

said shapes are devoid of carbonaceous material which will act as a reductant to said mill scale particles under the conditions existing in said bath of molten steel at the time of said adding step.

* * * * *

UNITED STATES PATENT AND TRADEMARK OFFICE
CERTIFICATE OF CORRECTION

PATENT NO. : 4,585,475

DATED : April 29, 1986

INVENTOR(S) : Donald R. Fosnacht

It is certified that error appears in the above-identified patent and that said Letters Patent is hereby corrected as shown below:

Column 6, line 54, after 24 hours of aging, insert --and further aging to--.

Signed and Sealed this

Nineteenth Day of August 1986

[SEAL]

Attest:

DONALD J. QUIGG

Attesting Officer

Commissioner of Patents and Trademarks